(12) United States Patent
Borthwick et al.

(10) Patent No.: US 7,152,060 B2
(45) Date of Patent: Dec. 19, 2006

(54) AUTOMATED DATABASE BLOCKING AND RECORD MATCHING

(75) Inventors: Andrew E. Borthwick, Brooklyn, NY (US); Martin Buechi, New York, NY (US); Arthur Goldberg, New York, NY (US)

(73) Assignee: Choicemaker Technologies, Inc., New York, NY (US)

( * ) Notice: Subject to any disclaimer, the term of this patent is extended or adjusted under 35 U.S.C. 154(b) by 321 days.

(21) Appl. No.: 10/411,388

(22) Filed: Apr. 11, 2003

(65) Prior Publication Data

US 2004/0019593 A1 Jan. 29, 2004

Related U.S. Application Data

(60) Provisional application No. 60/371,412, filed on Apr. 11, 2002.

(51) Int. Cl.
*G06F 7/00* (2006.01)

(52) U.S. Cl. .................. 707/3; 707/4; 707/6
(58) Field of Classification Search .......... 707/200, 707/202, 203, 3, 4, 6
See application file for complete search history.

(56) References Cited

U.S. PATENT DOCUMENTS

| | | | |
|---|---|---|---|
| 5,497,486 A | | 3/1996 | Stolfo et al. |
| 5,515,534 A | | 5/1996 | Chuah et al. |
| 5,668,987 A | * | 9/1997 | Schneider ............ 707/3 |
| 5,717,915 A | | 2/1998 | Stolfo et al. |
| 5,802,518 A | * | 9/1998 | Karaev et al. ............ 707/9 |
| 5,819,291 A | | 10/1998 | Haimowitz et al. |
| 5,960,430 A | | 9/1999 | Haimowitz et al. |
| 5,970,482 A | | 10/1999 | Pham et al. |
| 6,336,117 B1 | * | 1/2002 | Massarani ............ 707/100 |
| 6,438,741 B1 | * | 8/2002 | Al-omari et al. ........ 707/2 |
| 6,523,019 B1 | * | 2/2003 | Borthwick ............ 706/45 |
| 6,598,042 B1 | * | 7/2003 | Kienan ............ 707/3 |
| 6,804,662 B1 | * | 10/2004 | Annau et al. ............ 707/2 |

OTHER PUBLICATIONS

Article entitled "Record Linkage Software" by System Resources Cooperation et al., published in Nov. 18, 1999 (pp. 1-61).*
Aboulnaga, et al., "Self-tuning Histograms: Building Histograms Without Looking at Data" (1998).
Baxter, et al., A Comparison of Fast Blocking Methods for Record Linkage, *First Workshop on Data Cleansing, Record Linkage, and Object Consolidation* (Aug. 2003).
Bruno, et al., "Exploiting Statistics on Query Expressions for Optimization," *ACM SIGMOD 2002*, pp. 263-274 (Madison, Wisconsin Jun. 2002).
Bruno, et al., "STHolds: A Multidimensional Workload-Aware Histogram," *ACM SIGMOD 2001*, (Santa Barbara, CA May 2001).

(Continued)

*Primary Examiner*—Leslie Wong
*Assistant Examiner*—Mahesh Dwivedi
(74) *Attorney, Agent, or Firm*—Nixon & Vanderhye P.C.

(57) ABSTRACT

An automated blocking technique is used as a first step to find approximate matches in a database. The technique builds a blocking set to be as liberal as possible in retrieving records that match on individual fields or sets of fields while avoiding selection criteria that are predicted to return more than the maximum number of records defining a particular special requirement. The ability to do blocking without extensive manual setup at low cost is highly advantageous especially when using a machine learning based second-stage matching algorithm.

14 Claims, 3 Drawing Sheets

OTHER PUBLICATIONS

Cheng, et al., "Learning Belief Networks from Data: An Information Theory Based Approach" (1998).

Cohen, et al., "Hardening Soft Information Sources," pp. 255-259 *KDD '00 Boston, MA* (2000).

Deshpande, et al., "Independence is Good: Dependency-Based Histogram Synopses for High-Dimensional Data," *ACM SIGMOD 2001*, (Santa Barbara CA May 21-24, 2001).

Aglindo-Legaria, et al., "Statistics on Views," *Proceedings of the 29th VLDB Conference* (Berlin, Germany 2003).

Gu et al., "Record Linkage: Current Practice and Future Directions," *CMIS Technical Report No. 03/ 83* (Apr. 2003).

Haas, et al., "Selectivity and Cost Estimation for Joins Based on Random Sampling," *Journal of Computer and System Sciences* 52, 550-569 (Academic Press 1996).

Haas, et al., "Sequential Sampling Procedures for Query Size Estimation," *Proc. of 1992 ACM SIGMOD Intl. Conf. on Management of Data*, pp. 341-350 (1992).

Ioannidis, et al., "On the Propagation of Errors in the Size of Join Results," pp. 268-277, *Proc. ACM SIGMOD Intl. Conf.* (May 1991).

Jagadish, et al., "Optimal Histograms with Quality Guarantees," *Proceedings of the 24th VLDB Conference*, New York, USA (1998).

König et al., "Combining Histograms and Parametric Curve Fitting for Feedback-Driven Query Result-Size Estimation," *Proceedings of the 25th VLDB Conference*, Edinburgh, Scotland (1999).

Lipton, et al., "Practical Selectivity Estimation through Adaptive Sampling," *Proc. 1990 ACM SIGMOD Intl. Conf. Management of Data*, pp. 1-11 (May 7, 1992).

Mannino, et al., "Statistical Profile Estimation in Database Systems," *ACM Computing Surveys*, vol. 20 (3), pp. 1920221 (Sep. 1988).

Neiling, et al., "The good into the Pot, the bad into the Crop. Preselection of Record Pairs for Database Fusion," *Proceedings of the 1st Workshop on Database Fusion held in Magdeburg, Germany* (May 3-4, 2001).

Piatetsky-Shapiro, et al., "Accurate Estimation of the Number of Tuples Satisfying a Condition," *ACM SIGMOD Intl. Conf. on the Management of Data*, Boston, MA (1984).

Poosala, et al., "Improved Histograms for Selectivity Estimation of Range Predicates," pp. 294-305 (1995).

Poosala, et al., "Selectivity Estimation Without the Attribute Value Independence Assumption," *Proc. of the 23rd Int. Conf. on Very Large Databases* (Aug. 1997).

Stillger, et al., "LEO -n BS2's Learning Optimizer," *Proceedings of the 27th VLDB Conference*, Roma, Italy (2001).

Winkler, "Quality of Very Large Databases," Bureau of the Census Statistical Research Division, Statistical Research Report Series No. RR2001/04 (Jul. 25, 2001).

IBM Technical Disclosure Bulletin, "Inverting Noun-de-Noun Constructions in French-to-English Translation," U.S., 3 pages (Oct. 1, 1994).

Verykois, V.S. and Elmagarmid, A.K., "Automating the Approximate Record Matching Process," Computer Sciences Dept., Purdue University, West Lafayette, IN (Jun. 15, 1999).

Chen, Ming-Syan et al., "Data Mining: An Overview from a Database Perspective," IEEE Transactions on Knowledge and Data Engineering, vol. 8, No. 6 (Dec. 1996).

Jaynes, E.T., "Information Theory and Statisical Mechanics," The Physical Review, vol. 106, No. 4, 620-630 (May 15, 1957).

Getoor, L., et al., "Selectivity Estimation using Probabilistic Models," ACM SIGMOD May 21-24, 2001 Santa Barbara, California.

Winkler, W.E., "Record Linkage and Machine Learning," Virginia Tech (Nov. 1, 2001.

Belin, T.R. and Rubin, D.B., "A Method for Calibrating False-Match Rates in Record Linkage," Journal of the American Statistical Association, vol. 90, Issue 430, 697-707 (Jun. 1995).

Copas, J.B., and Hilton, F.J., "Record Linkage: Statistical Models for Matching Computer Records," Journal of the Royal Statistical Society, Series A (Statistics in Society), vol. 153, Issue 3, 287-320 (1990).

Lait, A.J. and Randell, B., "An Assessment of Names Matching Algorithms," Dept. of Computing Science, University of Newcastle upon Tyne, unpublished (Sep. 1995).

Porter, E.H. and Winkler, W.E., "Approximate String Comparison and its Effect on an Advanced Record Linkage System,".

Winkler, W.E., "On Dykstra's Iterative Fitting Procedure," Annals of Probability, vol. 18, issue 3, 1410-1415 (Jul. 1990).

"Record Linkage Techniques—1997," Proceedings of an International Workshop and Exposition Arlington, VA (Mar. 20-21, 1997).

Record Linkage Workshop: Bibliography of Background Papers, U.S. Census Bureau, http://www.census.gov.srd/www/reclink/biblio.html (Jul. 18, 2002).

Recommendations, The Matching Group, Administrative Records Subcommittee, Federal Committee on Statistical Methodology (May 1985).

RLESearch—Probabilistic record linking engine, heep://nedinfo.nih.gov/docs/RLESearch.htm(Jul. 18, 2002).

Caruso, F., et al., "Telcordia's Database Reconciliation and Data Quality Analysis Tool," Proceedings of the 26th International Conference on Very Large Databases, Cairo, Egypt (2000).

Cochinwala, M., et al., "Efficient data reconciliation" Information Sciences 137 (2001) 1-15, Telcordia Technologies Inc. Published by Elsevier Science Inc.

Citations: Efficient Data Reconciliation—Cochinwala, Kurien, Lalk, Shasha, hppt://citeseer.nj.nec.com/context/2036079/0, printed Nov. 17, 2003.

*Efficient Clustering of High-Dimensional Data Sets with Application to Reference Matching* McCallum, A., Nigam, K., Ungar, L. In KDD-00, 2000.

*Learning to Match and Cluster Large High-Dimensional Data Sets For Data Integration* Cohen, W., Richman, J. In SIGKDD'02, 2002.

*Record Matching: Past, Present and Future* Cochinwala, M., Dalal S., Elmagarmid A., and Verykios, V. Submitted to ACM Computing Surveys, 2003.

*Join Synopses for Approximate Query Answering* Acharya, S., Gibbons, P., Poosala, V., Ramaswamy, S. In Proceedings of the ACM SIGMOD Conference, pp. 275-286. ACM Press, 1999.

*Algorithms for Index-Assisted Selectivity Estimation* Aoki, P. In ICDE, p. 258, 1999.

*The New Jersey Data Reduction Report* Barbara, D., DuMouchel, W., Faloutsos, C., Haas, P., Hellerstein, J., Ioannidis, Y., Jagadish, H., Johnson, T., Ng, R., Poosala, V., Ross, K., Sevcik, K. Data Engineering Bullletin, 20 (4), 1997.

*Duplicate Record Elimination in Large Data Files* Bitton, D., DeWitt, D. ACM Transactions on Database Systems 8 (1983), No. 2, 255-265. #312.

*Approximate Query Processing Using Wavelets* Chakrabarti, K., Garofalakis, M., Rastogi, R., Shim, K. In Proceedings of 26th International Conference on Very Large Data Bases, Cairo, Egypt, pp. 111-122, 2000.

*Adaptive Selectivity Estimation Using Query Feedback* Chen, C., Roussopoulos, N. In Proceedings of the 1994 ACM SIGMOD International Conference on the Management of Data, pp. 161-172. ACM Press, 1994.

*Estimating Block Transfers and Join Sizes* Christodoulakis, S. In Proceedings of the ACM SIGMOD International Conference on Management of Data, pp. 40-54, San Jose, California, May 1983.

*Estimating Record Selectivities* Christodoulakis, S. Information System, 8(2): 105-115, 1983.

*Using Feature Hierarchies in Bayesian Network Learning (Extended Abstract)* desjardins, M., Getoor, L., Koller, D. Lecture Notes in Artificial Intelligence, 1864, 2000.

*A Sequential Technique for Efficient Record Linkage* Dey, D., Mookerjee, V. Submitted to Operations Research Journal, 2000. Not included—no longer accessible.

*Entity Matching in Heterogeneous Databases: A Distance Based Decision Model* Dey, D., Sarkar, S., De, P. Proceedings of the 31st Hawaii International Conference on System Sciences, 1998.

*TAILOR: A Record Linkage Toolbox* Elfeky, M., Verykios, V., Elmagarmid, A. Proceedings of the ICDE'02, 2002.

Vassilios S. Verykios, Ahmed K. Elmagarmid, Elias N. Houstis: Automating the approximate record-matching process. Inf. Sci. 126(1-4): 83-98 (2000).

*A Theory for Record Linkage* Felligi, I., Sunter, A. In JASA, 1969. #10.
*AJAX: An Extensible Data Cleaning Tool* Galhardas, H., Florescu, D., Shasha, D., SimonE. In Proceedings of ACM SIGMOD (Dallas, Texas, 2000), pp. 590.
*Declarative data cleaning: Language, Model, and Algorithms* Galhardas, H., Florescu, D., Shasha, D., Simon, E., Saita, C. In Proc. of the 27th VLDB Conf., 2001.
*Learning Probabilistic Relational Models* Getoor, L., Friedman, N., Koller, D., Pfeffer, A. In Proceedings of the 18th Conference on Machine Learning, pp. 170-177, San Francisco, CA, 2001. Morgan Kaufmann.
*Sequential Sampling Procedures for Query Size Estimation* Haas, P., Swami, A. In Proceedings of 1992 ACM SIGMOD International Conference on Management of Data, pp. 341-350, 1992.
*Query Size Estimation using Systematic Sampling* Harangsri, B., Shepherd, J., Ngu, A. CODAS 1996: 550-553.
*A Generalization of Band Joins and the Merge/Purge Problem* Hernandez-Sherrington, M. Ph.D. thesis, Department of Computer Sciences, Columbia University, 1996.
*Real-world data is dirty: Data Cleansing and the Merge/Purge problem* Hernandez, M., Stolfo, S. Journal of Data Mining and Knowledge Discovery, 1 (2), 1998.
*The Merge/Purge Problem for Large Databases* Hernanadez, M., Stolfo, S. In Proc. of 1995 ACT SIGMOD Conf., pp. 127-1 38, 1995.
*Identifying and Merging Related Bibliographic Records* Hylton, J. Master's thesis, Department of Electrical Engineering and Computer Science, Massachusetts Institute of Technology, 1996.
*On the Propagation of Errors in the Size of Join Results* Ioannidis, Y., Christodoulakis, S. ACM SIGMOD 1991.
*Balancing Histogram Optimality and Practicality for Query Result Size Estimation* Ioannidis, Y., Poosala, V. In SIGMOD, 233-244, 1995.
*Efficient Record Linkage in Large Data Sets* Jin I Li C., Mehrotra, S. Paper 113, UC Irvine Tech Reports, 2001. #.
*Record linkage techniques—1985* Kilss, B., Alvey, W. Proceedings of the Workshop on Exact Matching Methodologies, May 1985, Department of the Treasury, Internal Revenue Service, Statistics Income Division. Not included—no longer accessible.
*Practical Selectivity Estimation through Adaptive Sampling* Lipton, R., Naughton, J., Schneider, D. In H. Garcia-Molina and H.V. Jagadish, editors, Proceedings of the 1990 ACM SIGMOD International Conference on the Management of Data, pp. 1-11. ACM Press, 1990.
*Query Size Estimation by Adaptive Sampling (Extended Abstract)* Liplon, R., Naughton, J. Journal of Computer and System Science, 51, 18-25, 1985. #315.
*Selectivity Estimation and Query Optimization in Large Databases with Highly Skewed Distributions of Column Values* Lynch, C. Proc. 14th VLDB Conf., Los Angeles, CA, Aug. 1988. #316.
*Statistical Profile Estimation in Database Systems* Mannino M., Chu, P., Sager, T. Computing Surveys 20, 3 (Sep. 1988), 191-221.
*Wavelet-Based Histograms for Selectively Estimation* Matias, Y., Vitter, J., Wang, M. Proc. of the 998 ACM SIGMOD Intern. Conf. on Management of Data, 1998.
*Matching Algorithms within a Duplicate Detection System* Monge, A. Bulletin of the Technical Committee on Data Engineering, 23, 4, 2000.
*An efficient domain-independent algorithm for detecting approximately duplicate database records* Monge, A., Elkan, C. In Proc. of SIGMOD-1 997 Workshop on Research Issues on Data Mining and Knowledge Discovery, pp. 23-29, Tucson, AZ, May 1997, #27.
*Adaptive detection of approximately duplicate database records and the database integration approach to information discovery* Monge, A. Ph.D. thesis, Department of Computer Science and Engineering, University of California, San Diego, 1997.
*The Field Matching Problem: Algorithms and Applications* Monge, A., Elkan, C. Second International Conference on Knowledge Discovery and Data Mining (1996), 267-270, AAAI Press. #85.
*Equi-depth histograms for estimating selectivity factors for multidimensional queries* Muralikrishna, M., DeWitt, D. Proc. ACM SIGMOD, 1988, 28-36.

*Automatic Linkage of Vital Records* Newcombe, H., Kennedy, J., Axford, S., James, A. Science 130 (1959), No. 3381, 954-959. Not included—no longer accessible.
*Record Linking: The Design of Efficient Systems for Linking Records into Individual and Family Histories* Newcombe, H. American Journal of Human Genetics 19 (1967), No. 3. Not included—no longer accessible.
*Accurate Estimation of the Number of Tuples Satisfying a Condition* Piatetsky-Shapiro, G., Connell, C. In Proc. of the ACM SIGMOD Conference, pp. 256-276, 1984.
*Selectivity Estimation Without the Attribute Value Independence Assumption* Poosala, V., Ioannidis, Y. Proceedings of VLDB, Athens Greece, pp. 486-495, Aug. 1997.
*Histogram-Based Estimation Techniques in Database Systems* Poosala, V. Ph. D. thesis, University of Wisconsin-Madison, 1997. Not included—no longer accessible.
*Potter's Wheel: An Interactive Data Cleaning System* Raman, V., Hellerstein, J. In Proc. VLDB (Roma, Italy, 2001), pp. 381-390.
*An Instant and Accurate Size Estimation Method for Joins and Selection in a Retrieval-Intensive Environment* Sun, W., Ling, Y., Rishe, N., Deng, Y. In Proceedings of the ACM SIGMOD Conference, pp. 79-88, 1993. #317.
*On the Accuracy and Completeness of the Record Matching Process* Verykios, V., Elmagarmid, A., Elfeky, M., Cochinwala, M., Dalal, 5. 2000 Information Quality Conference (2000), 54-69.
*Exact Matching Lists of Businesses: Blocking, Subfield Identification, and Information Theory* Winkler, W. In Kilss and Alvey (1985), pp. 227-241, U.S. Internal Revenue Service, Publication 1299 (2-86).
*Record Linkage Software and Methods for Merging Administrative Lists* Winkler, W. Statistical Research Division Technical Report RRO1-03, U.S. Bureau of Census, 2001.
*The State of Record Linkage and Current Research Problems* Winkler, W Proceedings of the Survey Methods Section (1999), 73-79.
*WHIRL: A Word-based Information Representation Language* Cohen, W. Artificial Intelligence, 118:163-196, 2000.
*Febrl—Freely extensible biomedical record linkage* Christen, P., Churches, T. Release 0.2 edition, Apr. 2003.
*Advances in Record-Linkage Methodology as Applied to Matching the 1985 Census of Tampa, Florida* Jaro, M. Journal of the American Statistical Association 84(1989), No. 406, 414-420.
IBM, "Using Information Entropy to Select Learning Words," *Mar. 1992, IBM, 34, 10B, 19-20.*
*Yuhe Li et al., "Reducing Uncertainties in Data Mining," 1997, IEEE, 0-8186-8271-X/97, 97-105.*
Arellano, M.G., "Assessing the significance of a match," unpublished. Advanced Linkage Technologies of America, Inc. (Jan. 17, 1995).
Arellano, M.G., "An implementation of a two-population Fellegi-Sunter probability model," U.S. Dept. of the Treasure, Publication 1200 (Dec. 1985).
Arellano, M.G., "Issues in identification and linkage of patient records across an integrated delivery system," *Journal of Healthcare Information Management,* 12 (3) 43-52 (Fall 1998).
Arellano, M.G. et al., "A probabilistic approach to the patient identification problem," *Proceedings of the Fifth Annual Symposium on Computer Applications in Medical Care* (Nov. 1981).
Cohen, W.W., "Integration of heterogeneous databases without common domains using queries based on textual similarity," *Proceedings of the ACM SIGMOD Conference on Data Management* (1998).
Cohen, W.W., "Some practical observations on integration of Web information," WebDB '99 (1999).
Fair, M.E., et al., "Application of exact ODDS for partial agreements of names in record linkage," *Computers and Biomedical Research* 24, 58-71 (1991).
Friedman, C. et al., "Tolerating spelling errors during patient validation," *Computers and Biomedical Research* 25, 486-509 (1992).
Galhardas, H., et al., "An extensible framework for data cleaning," Tech. Rep. Institut National De Recherche en Informatique et en Automatique (Jul. 1999).

Jaro, M.A., Probabalistic linkage of large public health data files, *Statistics in Medicine* 14, 491-498 (1995).

Jocums, S., et al., "Using vital records linkage," *American Journal of Preventitive Medicine*, 11(2): 75-78 (1995).

Macleod, M.C.M., et al., "Enhancing the power of record linkage involving low quality personal identifiers: use of the best link principle and cause of death prior likelihoods," *Computers and Biomedical Research* 31, 257-270 (1998).

Newcombe, H.B., et al., "The use of names for linking personal records," *Journal of the American Statistical Association 87* (Dec. 1992).

Semaphore Corporation, "Merge/Purge and Duplicate Detection," Web page, http://www.semaphorecorp.com/mpdd/mpdd.html (1996).

DuBose, J.S., "Retaining duplicate data in an immunization registry," Pamphlet distributed by Scientific Technologies Corporation (Aug. 1998).

DuBose, J.S., "Defining duplicate records in an immunization registry," Pamphlet distributed by Scientific Technologies Corp. (Aug. 1998).

Trecom Business Systems and Dataline Inc., "UPIF process architecture," unpublished system documentation (Oct. 1997).

Berger, A.L., et al., "A maximum entropy approach to natural language processing," *Computational Linguistics* 22(1):39-71 (1996).

Berger, A.L., et al., "A comparison of criteria for maximum entropy/minimum divergence feature selection," in Proceedings of the Third Conference on Empirical Methods in Natural Language Processing, N. Ide and A. Boutilainen, Eds., The Association for Computational Linguistics, pp. 97-106 (Jun. 1988).

Borthwick, A., "A Maximum Entropy Approach to Named Entity Recognition," PhD thesis, New York University, Available from the NYU Computer Science Dept. Library or at http://cs.nyu.edu/cs/projects/proteus/publication/index.html (1999).

Crystal, M.R. et al., Studies in Data Annotation Effectiveness, *Proceedings of the DARPA BRoadcase News Workshop(HBU-4)* (Feb. 1999).

Della Pietra, S., et al., "Including features of random fields," Technical Report CMU-CS-95-144, Carnegie Mellon University (1995).

Newcombe, H.B., "Handbook of Record Linkage: Methods for Health and Statistical Studies, Administration, and Business," Oxford Medical Publications (1988).

Printz, H., "Fast computation of maximum entropy/minimum divergence model feature gain," In Proceedings of the Fifth International Conference on Spoken Language Processing (1998).

Rosenfeld, R., "Adaptive Statistical Language Modeling: A Maximum Entropy Approach," PhD thesis, Carnegie Mellon University, CMU Technical Report CMU-CS-94-138 (1994).

Ukonnen, E., "Finding Approximate Patterns in Strings," *Journal of Algorithms* 6:132-137 (1985).

Neiling, M., "Data Fusion with Record Linkage," *Online Proceedings of the 3rd Workshop Föderierte Datenbanken*, (Dec. 11, 1998).

Ratnaparkhi, A., "A Maximum Entropy Model for Part-of-Speech Tagging," *Proceedings of the Conference on Empirical Methods in Natural Processing*, (1996).

Pinheiro, Jose C., et al., "Methods for Linking and Mining Massive Heterogeneous Databases," *Proceedings of the Fourth International Conference on Knowledge Discovery and Data Mining* (Aug. 27-31, 1998).

\* cited by examiner

Fig. 1 Typical run-time architecture of a record matching system incorporating blocking

Fig. 2 First name frequencies

AUTOMATED DATABASE BLOCKING AND RECORD MATCHING

CROSS-REFERENCES TO RELATED APPLICATIONS

This application claims the benefit of Provisional Application No. 60/371,412, filed Apr. 11, 2002, entitled "AUTOMATED DATABASE BLOCKING AND RECORD MATCHING", which is incorporated herein by reference. This application is also related to commonly assigned copending patent application Ser. No. 10/325,043, filed Dec. 23, 2002 entitled. "A PROBABALISTIC RECORD LINKAGE MODEL DERIVED FROM TRAINING DATA" which is a continuation of U.S. Pat. No. 6,523,019, the entire contents of which are hereby incorporated by reference herein.

STATEMENT REGARDING FEDERALLY SPONSORED RESEARCH OR DEVELOPMENT

Not applicable.

FIELD

This application relates generally to record matching, and more particularly to blocking algorithms for selecting records for further processing. Still more particularly, this application relates to efficient algorithms for dynamically constructing or selecting queries that will return a maximum number of potentially matching records.

BACKGROUND AND SUMMARY

As the world becomes more and more computerized, so-called databases storing computerized information have become more significant and important. Most corporate, government and other entities make extensive use of database technology. For example, databases are used to keep track of your drivers license and car registration information, your medical records, your financial and banking information, your telephone number and address, and much other information.

Some databases are huge. Maintaining large databases can be difficult, time consuming and expensive. Duplicate records create an especially troublesome problem. Suppose for example that when a customer named "Joseph Smith" first starts doing business with an organization, his name is initially inputted into the computer database as "Joe Smith". The next time he places an order, however, the sales clerk fails to notice or recognize that he is the same "Joe Smith" who is already in the database, and creates a new record under the name "Joseph Smith". A still further transaction might result in a still further record under the name "J. Smith." When the company sends out a mass mailing to all of its customers, Mr. Smith will receive three copies—one to "Joe Smith", another addressed to "Joseph Smith", and a third to "J. Smith." Mr. Smith may be annoyed at receiving several duplicate copies of the mailing, and the business has wasted money by needlessly printing and mailing duplicate copies.

It is possible to program a computer to eliminate records that are exact duplicates. However, in the example above, the records are not exact duplicates, but instead differ in certain respects. It is difficult for the computer to automatically determine whether the records are indeed duplicates. For example, the record for "J. Smith" might correspond to Joe Smith, or it might correspond to Joe's teenage daughter Jane Smith living at the same address. Jane Smith will never get her copy of the mailing if the computer is programmed to simply delete all but one "J_Smith." Data entry errors such as misspellings can cause even worse duplicate detection problems.

There are other situations in which different computer records need to be linked or matched up. For example, suppose that Mr. Smith has an automobile accident and files an insurance claim under his full name "Joseph Smith." Suppose he later files a second claim for another accident under the name "J. R. Smith." It would be helpful if a computer could automatically match up the two different claims records—helping to speed processing of the second claim, and also ensuring that Mr. Smith is not fraudulently attempting to get double recovery for the same accident.

Large databases create special problems in terms of efficient computing. It can take minutes, hours or sometimes even days to perform complex processes on large databases. It is generally desirable to reduce the amount of time required to perform such processing. This places a premium on more efficient database processing techniques.

One way to increase the efficiency of database and other record matching processing is to introduce a so-called "blocking" step. In the field of approximate record matching, a "blocking" step generally refers to a fast matching algorithm primarily used as the first step of a larger record matching system. The goal of a blocking step is generally to find all possible matches to an input query record. It is not ordinarily to aim for precision in determining which record is the correct match. Blocking thus aims for maximum "recall" or "sensitivity", possibly at the expense of achieving high "precision" or "specificity". In effect, blocking is a sort of "is it in the ballpark?" test that can be used to narrow down the number of records that need to be processed by a higher precision but more computationally intensive (or even manual) subsequent matching test.

Blocking algorithms have important applications in the field of approximate record matching. For example, they can be used to identify database records that might represent the same physical entity. These records can then be manually reviewed, or they could be automatically declared a match if the user does not require great accuracy. Another application (perhaps the most commonly used one) is to use a blocking algorithm as a first stage of a more accurate and computationally expensive record matching process. In this instance, in the second stage, one may use some matching technique to determine which record in the database is the best match to the "query record" being sought in the database. The second-stage matching algorithm then generally tests every record returned by the blocking algorithm against the query record to see if they match.

The initial blocking step is very useful because even with an extremely fast matching algorithm, when de-duplicating a database of n records where n is of any magnitude, it would generally be time-prohibitive and ineffective for the system to attempt to examine all (n*(n−1))/2 pairs of records in the database. Record matching systems often use a preliminary "blocking" step to reduce the number of pairs of records that the second-stage matching algorithm (SSMA) has to examine.

Traditional blocking methods are generally based on an ad hoc judgment of the usefulness of different fields in a matching decision. For instance, a healthcare site might use Medicaid and medical record number matches as blocking characteristics—meaning that any records matching on those two fields would be passed on to the second-stage matching algorithm. Also commonly used are matches on birthday and first name, birthday and last name, birthday and Soundex code of last name, etc.

This traditional approach can work reasonably well, but its ad hoc nature places a limitation on the portability of any system built around it. It also has a problem of generating too many false negative responses (i.e., records that should have been linked, but were not). The quality of the blocking routine is important to the ability of the system to minimize the number of false negatives since pairs that are not seen as possible matches in the blocking phase will be missed even if the second-stage matching algorithm's decision-making engine would have assigned them a high probability, or score, of match. At the same time, the system has to carefully manage tradeoffs between false negatives and run-time performance. If the blocking algorithm is too liberal in passing along hypothetical matches, system run-time may exceed the user's tolerance.

We provide an automated blocking technique that can be used for example as a first step to find approximate matches in a database. Exemplary illustrative non-limiting implementations of the technique build a blocking set to be as liberal as possible in efficiently retrieving records that match on individual fields or sets of fields while avoiding selection criteria that are predicted to return more than the maximum number of records defining a particular special requirement. The ability to do blocking without extensive manual setup at low cost is highly advantageous including but not limited to situations where a machine learning based or other second-stage matching algorithm is being used.

BRIEF DESCRIPTION OF THE DRAWINGS

These and other features and advantages provided in accordance with presently preferred exemplary embodiments of the invention will be better and more completely understood by referring to the following detailed description in connection with the drawings, of which.

DETAILED DESCRIPTION OF EXEMPLARY EMBODIMENTS

Figure 1:
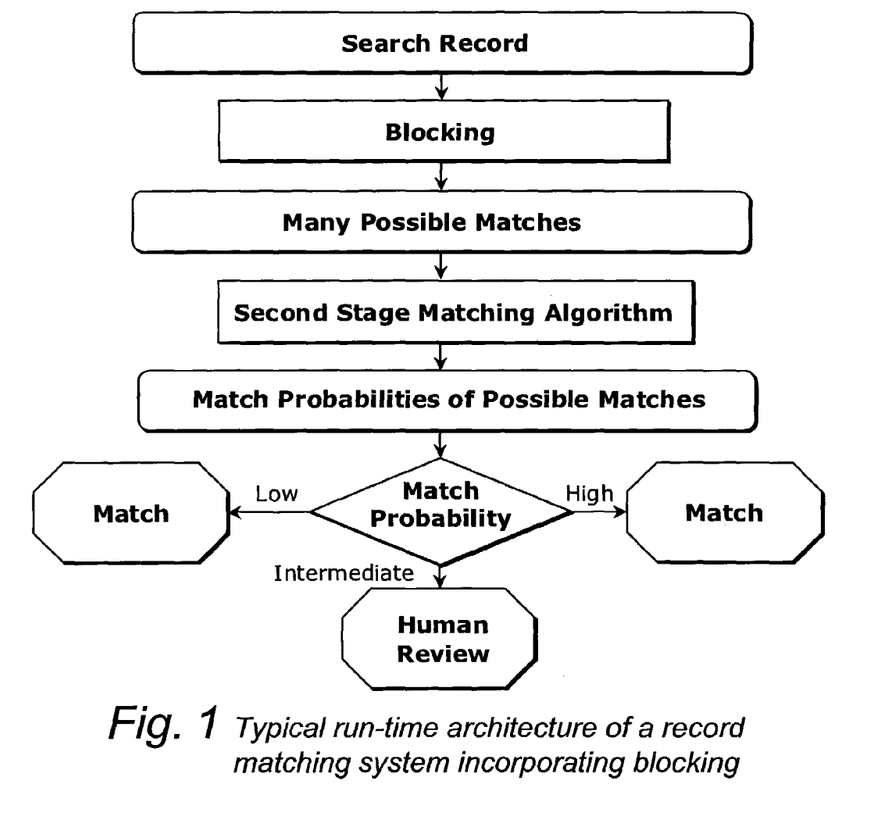
FIG. 1 is a typical illustrative run-time architecture of a record matching system incorporating blocking.

FIG. 1 shows an exemplary non-limiting overall typical run-time architecture of a record matching system incorporating blocking. As shown in FIG. 1, the process begins by searching records and performing a blocking step to limit the number of records that are returned by the search query. The blocking step returns many possible matches. A second stage matching algorithm is then applied to discover approximate or actual matches. Such a second stage matching algorithm may for example be as described in U.S. Pat. No. 6,523,019. Such an algorithm can match the probabilities of possible matches. An optional final human review step may be employed if high accuracy is required.

In one illustrative non-limiting implementation, given a search record, S, for which we are trying to find approximate matches in database D, blocking is the preferred first phase of an approximate record matching system. In this exemplary instances, blocking identifies a set of records, B, from D which are possible matches to S. The set of records B, is then passed on to the second-stage matching algorithm's core decision-making component, which outputs a probability for each record in B that it matches S. See FIG. 1.

Since the blocking algorithm performs the initial selection of candidate match records from D, any matching records that it fails to retrieve from D, cannot be identified as matches by the second-stage matching algorithm. A blocking algorithm thus forms a lower bound on the system's overall rate of missed matches. On the other hand, a blocking algorithm that retrieves a set of records B that is too large will slow the system because too many records have to be retrieved from the database and compared against S by the decision-making component. Furthermore, it may in many instances be advantageous to achieve these competing goals of speed and accuracy without requiring the user to do extensive experimentation and system configuration.

The automated blocking algorithm ("ABA") of the preferred illustrative exemplary embodiment satisfies all three of these goals with a new approach to the problem of blocking. For a given speed requirement, which takes the form of a maximum number of records to be returned, the automated blocking algorithm uses a set of database (e.g., SQL or other conventional format) SELECT statements, which we call "blocking sets." In one example non-limiting embodiment, each blocking set is built to be as liberal as possible in retrieving records that match S on individual fields or sets of fields while not containing SELECT statements that are predicted to return more than the maximum number of records.

One non-limiting example embodiment of an automated blocking algorithm is for a relational database accessed through SQL. Note, however, that this should not be construed as confining the work to relational databases accessed through SQL. The algorithms can also be used in conjunction with any relational or non-relational databases, including but not limited to object-oriented, object-relational, and network databases, as well as other data stores, including but not limited to flat files, XML files, and in-memory data stores. Furthermore, the algorithms can also be used to access data stores by means other than SQL, including but not limited to proprietary APIs for example.

One example non-limiting embodiment provides blocking sets as a union of SELECT statements. Note, however, that this should not be construed as confining the work to this specific form of queries. Any other form of queries that returns the same result may be used.

The ability to do blocking without extensive manual setup is useful to deploy a highly accurate system at a low implementation cost. Especially for example when the second-stage matching algorithm is based on a machine learning technique, the automated blocking algorithm's ability to automatically determine accurate blocking criteria on a query-by-query basis complements a machine learning system's ability to train itself from user-supplied data. In both cases, we are lessening the need for programming by technical/domain experts.

Note that nothing in this description should be construed as confining the work to the combination with a second-stage matching algorithm that uses machine learning. The technology described herein is also useful without a second-stage matching algorithm or with a second-stage matching algorithm that is not based on machine learning.

Detailed Exemplary Non-Limiting Implementation

Consider searching a database, D, for records that approximately match a search, S. S might consist of values that are hand-entered by the user, or it might be a record in another database, or a record from D itself for which we are seeking duplicate records. Because D may be too large to match S against all records, a blocking stage is used to select from D those records that potentially match S.

We have designed and developed an illustrative non-limiting Automatic Blocking Algorithm (ABA) that satisfies the following objectives:

Miss as few possible matches as practical (relying on the next stage to reject non-matches).

Use indices in D to perform quickly and avoid table scans.

Deploy easily against a new database.

Return some records.

Do not return too many records (where the value of 'too many' depends on performance characteristics, and typically lies between 100 and 1000) so that the entire approximate matching system runs quickly.

Conceptually, the exemplary automated blocking algorithm works as follows: the automated blocking algorithm maintains a table of counts of the common values in every field. On receiving a search, the automated blocking algorithm constructs or chooses a blocking query, Q, to retrieve entities similar to S. Q is structured as a union of SQL SELECT statements ($q_1$ UNION $q_2$ UNION ... UNION $q_n$), where each $q_i$ selects entities matching a particular set of fields in S. Each $q_i$ is built so that the number of records it is expected to return lies below a specified threshold. This threshold is based on the frequencies with which the values in S appear in D (automated blocking algorithm treats these values as being independent). The set of q's is constructed so as to consider all possible subsets of the fields in S, while avoiding those useless $_q$'s which represent only a subset of the records returned by another $q_i$. The implementation of automated blocking algorithm employs optimizations to keep the counts table small, and to avoid the possibly exponential size of Q.

The exemplary automated blocking algorithm misses few possible matches because it examines many sets of possible matching fields beginning with the least restrictive. It performs quickly because it always matches against indexed fields, and because it returns an appropriate number of possible matches enabling the retrieval from the database and the subsequent matching stage to run quickly. The exemplary automated blocking algorithm can be easily deployed since its configuration simply involves identifying matching fields and a threshold for the maximum number of records to be returned—all other parameters are obtained directly from the data. Instead of manually defining the set of matching fields, an optimal set can also be automatically computed based on the threshold for the maximum number of records to be returned or based on a specified maximum error rate.

Desirable Exemplary Non-Limiting Blocking Algorithm Characteristics

Minimize Missed Matches

Exemplary search errors are classified as shown in the following table.

| Error term | Type | Meaning |
| --- | --- | --- |
| False negative | I | An entity should have been matched, but was not- "missed match." |
| False positive | II | An entity was matched, but should not have been- "mistaken match." |

Since possible matches that blocking misses never reach the matching phase, they are completely missed. Thus the blocker determines the lower bound on the rate of missed matches and therefore minimizes its missed matches in one example embodiment.

Perform Well

Blocking should usually perform rapidly. Users of on-line systems care most about response time while users of batch systems care about throughput. Typical desired values (for a concurrent system) are listed in the following table.

| Characteristic | Desirable performance range (low–high) |
| --- | --- |
| Response time | 1000–5 [ms] |
| Throughput | 5–1000 [transactions/sec] |

While somewhat arbitrary, the desired values are derived from recent experience in the real world. For example, one example requirement is "the ability for the solution to execute transactions in real time and batch must not exceed 250 milliseconds per record processed."

Easy Deployment

Blocking should be easy to deploy and require minimal configuration. Required programmer interventions include:

Connecting blocking to the database.

Identifying fields for matching against the search (i.e. build the configuration table). This can also be done automatically.

Selecting data matching functions to correct for errors in the identified fields. This can be done manually or automatically for a predefined set of functions.

Creating indices and views in the database (this can also be done automatically based on the schema)

Select the thresholds, or alternatively the maximum error rate.

Beyond the interventions listed above, all other intervention should generally be avoided although other interventions may be desirable in specific circumstances. To promote portability to any database system, the blocking should employ standard (e.g., SQL or other conventional) operations to the extent possible.

Data Characteristics

In this section we discuss exemplary non-limiting data characteristics that have influenced the design of our blocking algorithm. We have analyzed the characteristics of a typical production database and searches with an eye toward error rates, missing data, and distributions of values. Although different databases and approximate searches may present different characteristics, this algorithm has been tested on a database of low-quality medical data. Algorithms that work on this difficult data are likely to work for other cases as well.

Complexity

For our study, we considered a data set consisting of 2283 entity pairs that clerks reviewed and identified as matching. We analyzed which fields (or functions on fields) matched in matching pairs to produce the table shown below. Each column of the table under the heading "Match field sets" identifies a field (or derived field—see below) whose matching rate we measure. Each row analyzes a matching query consisting of the disjunction of all the participating match fields marked with '•'. For example, letting PERSON_A and PERSON_B denote the 2 member records of a matched pair, the $5^{th}$ row represents records that would be selected by PERSON__A.LASTNAME=PERSON__B.LASTNAME
OR
PERSON__A.DOB=PERSON__B.DOB
OR
(PERSON__A.FIRSTNAME=PERSON__B.FIRSTNAME AND
SOUNDEX(PERSON__A.LASTNAME)=SOUNDEX(PERSON__B.LASTNAME))

where the function SOUNDEX ( ) evaluates to the Soundex of its argument. The last column, "Missed Match Fraction," indicates the fraction of the 2283 matching pairs that do not match on the row's matching query. For example, the 11$^{th}$ row indicates that all but 7.2% of the pairs match on DOB (date of birth), while the 3$^{rd}$ row indicates that all but 0.48% match on SOUNDEX (FIRSTNAME) or DOB. These two rows provide the best one-field and two-field matches, respectively.

Because we aim for error rates below 1%, this analysis clearly shows that multiple sets of fields must be matched to sufficiently lower the missed matches. For example, a major investment bank may be quite unhappy with the 4% missed match error rate it experiences with a conventional system. The analysis also clearly demonstrates the trade-off between few missed matches and returning too many records. This can be seen by observing that while SOUNDEX (FIRSTNAME) appears in two of the most accurate rows, for common-sounding names SOUNDEX (FIRSTNAME) will return far too many records, and cannot be used. Our exemplary illustrative automated blocking algorithm follows strategies that incorporate both of these observations.

| Field Name | Number of distinct values |
| --- | --- |
| Addresses | 3,625,481 |
| Medical Ids | 5,081,639 |
| Patient names | 2,557,744 |

Figure 2:
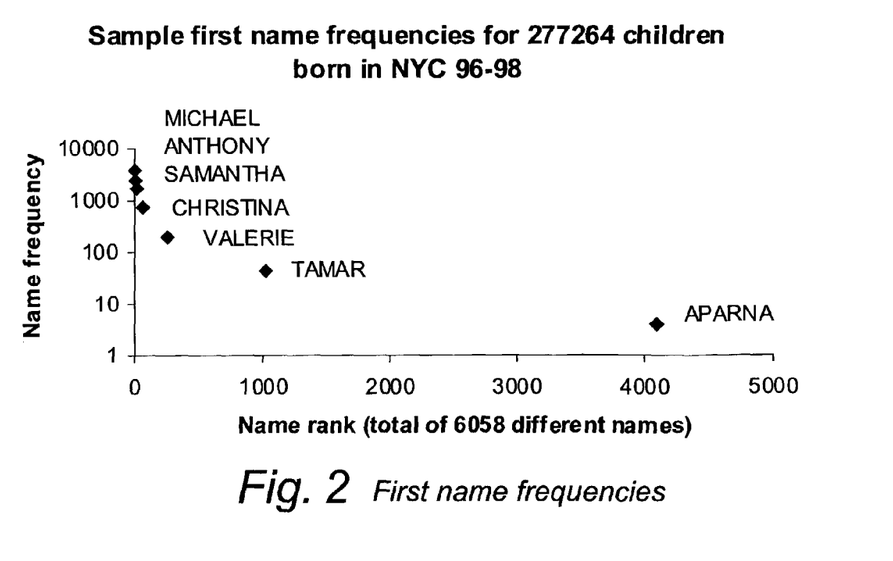
FIG. 2 is an exemplary illustration of first name frequencies in a database.

FIG. 2 shows one example of the huge variability of the value-frequency of first names for children. The variability motivates our example non-limiting use of 'data dependent' blocking, which avoids matching on excessively common values. To control the number of records returned, an exemplary illustrative automated blocking algorithm may, for example, match entities in D on first_name when the search's first_name is "Tamar" or a less frequent name, but not when the search's FIRSTNAME is "Christina" or a more frequent name, like "Michael."

An Exemplary Illustrative Non-Limiting Automated Blocking Algorithm

Notation

In this section we describe the structure of an exemplary non-limiting blocking algorithm's inputs and outputs and define some useful notation.

The query generated for search, S, is denoted as Q(S), or simply Q when S is clear from the context. In response to Q, the blocking phase returns the IDs of entities in the database,

| | First name | Last name | Soundex of Firstname | Soundex of Lastname | DOB | Firstname and Soundex of Lastname | Phone_no | Patient_id | Missed Match Fraction |
| --- | --- | --- | --- | --- | --- | --- | --- | --- | --- |
| 1 | | | • | • | • | | • | • | 0.00% |
| 2 | | | | • | • | | • | • | 0.31% |
| 3 | | | • | | • | | | | 0.48% |
| 4 | | | | • | • | | | | 0.66% |
| 5 | | • | | | • | • | | | 0.68% |
| 6 | | • | | | • | | | | 0.83% |
| 7 | • | | | | • | | | | 1.05% |
| 8 | • | • | | | | | | | 3.1% |
| 9 | | | • | | | | | • | 3.2% |
| 10 | | | • | | | | • | | 3.9% |
| 11 | | | | | | • | | | 7.2% |
| 12 | • | | | | | | | | 10.1% |
| 13 | | • | | | | | | | 13.1% |
| 14 | | | | | | | • | | 16.4% |
| 15 | | | | | | | | • | 81.8% |
| 16 | | | | | | | | • | 95.9% |

Match field sets

Size and Variability

D, that potentially match S. We sometimes refer to this set of IDs as the "possible matches."

We suppose that the search S specifies m fields $((Field_1, Value_1), (Field_2, Value_2), \ldots, (Field_m, Value_m))$ We consider databases with many tables, and tables with many records and fields. For example, one example installation might have a database containing 13 tables with useful data, totaling 65 fields with information. The database might contain for example data on 2,331,299 children (some duplicated) with the following distinct records:

which means that the search is looking for entities in D for which $Field_1$, if present, is approximately equal to $Value_1$, and $Field_2$ is approximately equal to $Value_2$, etcetera. Presently, we assume D contains one table T, but later we show how automated blocking algorithm handles multiple tables. Likewise, we will show how to handle multiple values for a given field.

The field T.ID contains the IDs of entities in D.

To find possible matches, we structure Q as the union of a set of select statements, each of which returns a set of IDs, like this:

Q: $q_1$ UNION $q_2$ UNION . . . UNION $q_n$ where each $q_i$ has the form $q_i$: SELECT ID FROM T WHERE $BS_i$ The WHERE clause $BS_i$ is called the blocking set. Each blocking set is structured as the conjunction of a set of fields in S, in this form $BS_i$: (Field$_a$=Value$_a$) AND (Field$_b$=Value$_b$) AND . . .

where the pairs Field$_a$, Value$_a$ are taken from S. The blocking set, $BS_i$, requires that the fields a, b, . . . must equal the values specified for them in S. Different blocking sets need not use all the fields in S, rather each one represents a different combination of 1 to m of the fields in S. (Below in Section 12 we incorporate functions on fields in S, which accommodate the 'approximately equal' meaning.) For example, suppose the schema for D is

```
T(
    ID,
    FIRST_NAME,
    LAST_NAME,
    DOB,
    CONTACTS_LAST_NAME,
    CONTACTS_MAIDEN_NAME)
    A search, S, might be the following:
((FIRST_NAME, 'JOE'),
(LAST_NAME, 'SMITH'),
(DOB, 'OCT. 01, 1998'),
(CONTACTS_FIRST_NAME, 'MARY'),
(CONTACTS_MAIDEN_NAME, 'RICHARDSON'))
```

An example query Q generated from this search could be:

```
SELECT ID FROM T WHERE
    DOB = 'OCT. 01, 1998'
UNION SELECT ID FROM T WHERE
    FIRST_NAME = 'JOE' AND CONTACTS_MAIDEN_NAME = 'RICHARDSON'
UNION SELECT ID FROM T WHERE
    LAST_NAME = 'SMITH' AND CONTACTS_MAIDEN_NAME = 'RICHARDSON'
UNION SELECT ID FROM T WHERE
    CONTACT_FIRST_NAME = 'MARY' AND CONTACTS_MAIDEN_NAME = 'RICHARDSON'
UNION SELECT ID FROM T WHERE
    FIRST_NAME = 'JOE' AND LAST_NAME = 'SMITH' AND
    CONTACT FIRST NAME = 'MARY'
```

Given a search that specifies m fields there are $2^m-1$ possible blocking sets. The goal of automated blocking algorithm is to choose fields for all the blocking sets $BS_i$ that best meet the requirements above.

Data Dependent Approach

Given a search S, automated blocking algorithm creates a new database query that depends on the fields, and the values, in S.

The goal is to choose the fields that comprise the blocking sets so that the expected number of records returned by a select on the blocking sets will not be too great. For example, if the size of T is 1 million, and the FIRST_NAME 'JOE' occurs 10,000 times (frequency 0.01) and the CONTACTS_MAIDEN_NAME 'RICHARDSON' occurs 1,000 times (frequency 0.001) then the query SELECT * FROM T WHERE FIRST_NAME='JOE' and CONTACTS_MAIDEN_NAME='RICHARDSON' should return about 1,000,000×0.01×0.001=10 records. This estimate assumes that values of different fields are not related. If values are correlated, the number of records returned will exceed the expected estimate. If the values are anti-correlated then the number of records returned may be less than the expected estimate.

To achieve the stated goal, our exemplary non-limiting automated blocking algorithm implementation considers all possible blocking sets, in increasing size of the number of conditions per blocking set. One exemplary automated blocking algorithm considers fields in order of increasing counts, that is, increasing expected number of records returned by a SELECT. Thus, this exemplary automated blocking algorithm maintains a set of possible sets, and when it considers a new field, tries adding the field to each possible set. If the possible set with the field is sufficiently selective, then it becomes a blocking set.

For example, First_name='JOE', occurring 10,000 times was not sufficiently selective, so it became a possible set. Adding CONTACTS_MAIDEN_NAME='RICHARDSON' (occurring 1,000 times) made the expected number of records 10, which is sufficiently selective, so FIRST_NAME='JOE' and CONTACTS_MAIDEN_NAME='RICHARDSON' becomes a blocking set.

Preparation

Data that are computed in advance of executing the blocking algorithm include the variable NUMBER_RECORDS, which stores a count of the number of records in T, and a COUNTS table.

Conceptually, the COUNTS table stores, for each field in T, the number of records that have that value in the corresponding field.

```
COUNTS (
    FIELD_NAME,    --  THE TEXT NAME OF THE FIELD
    VALUE,         --  A VALUE FOUND IN FIELD_NAME
                   --  (IGNORING TYPEING)
    COUNT INTEGER) --  THE NUMBER OF RECORDS IN T IN
                   --  WHICH FIELD_NAME IS EQUAL
                   --  TO VALUE
```

Recognizing that COUNTS may be expensive to maintain and store, we optimize it as described below.

Exemplary Non-Limiting Automated Blocking Algorithm Implementation

Figure 3:
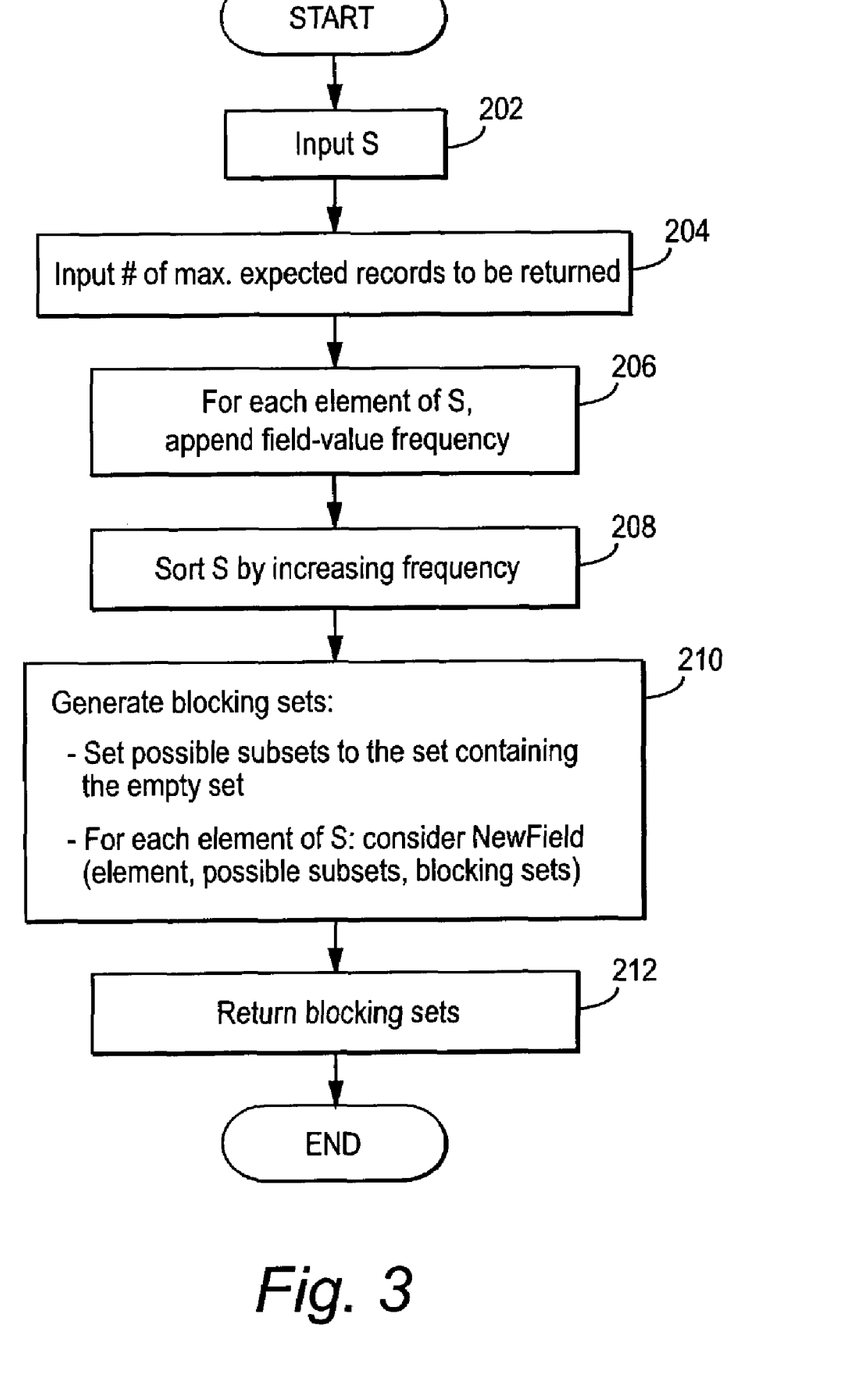
FIGS. 3 and 4 are flowcharts of an exemplary non-limiting automatic blocking algorithm.

Here we describe an example non-limiting implementation in conjunction with FIG. 3. Alternate implementations, using a backtracking approach, for instance, are possible.

Given search S, this algorithm produces the blocking sets.

```
1.  input S // the search, a list of (field,value) pairs (FIG. 3 block
    202)
2.  input Maximum_expected_records_returned (FIG. 3 block 204)
3.  for_each element in S
        append the field-value frequency, given by the value's
        COUNT/NUMBER_RECORDS (FIG. 3 block 206)
4.  end_for
5.  sort S by increasing frequency (FIG. 3 block 208)
6.  output Generate_blocking_sets(S)
a_set_of_sets_of_field_value_pairs Generate_blocking_sets(S)
// Generate blocking sets for search S, S is a list of field,value,
frequency) triplets (FIG. 3 block 210)
    1.  Possible_Subsets: a_set_of_sets_of_field_value_pairs //
        possible subsets of blocking sets
    2.  insert empty_set into Possible_Subsets
    3.  Blocking_sets: a_set_of_sets_of_field_value_pairs
    4.  for_each element in S
    5.      ConsiderNewField(element, Possible_Subsets,
            Blocking_sets)
    6.  end_for
    7.  return Blocking_sets (FIG. 3 block 212)
```

Figure 4:
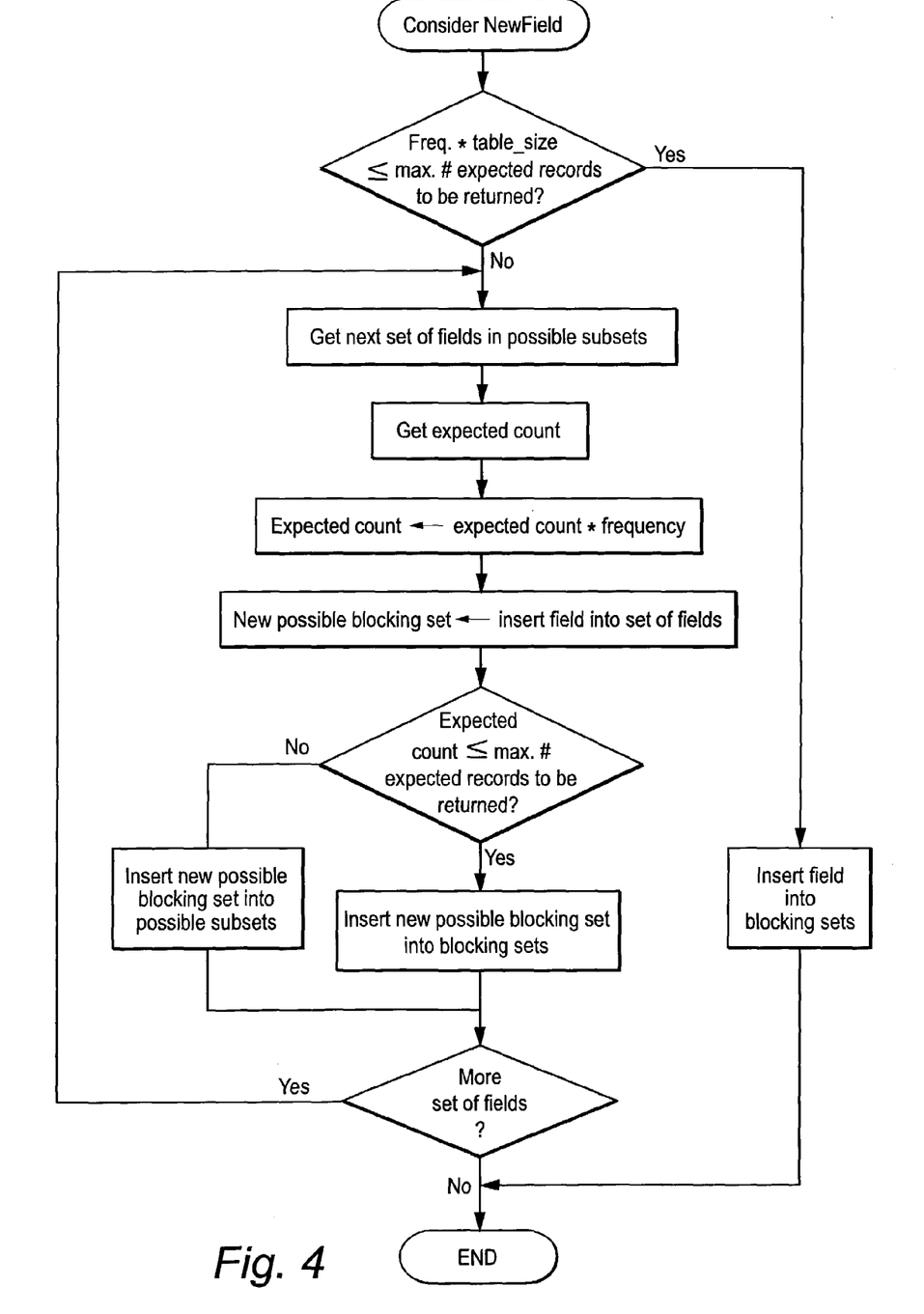

The following describes an exemplary non-limiting implementation of the ConsiderNewField function in connection with FIG. 4.

ConsiderNewField((field,value,frequency); in/out: Possible_Subsets, Blocking_sets)

```
// try to make blocking sets: consider adding 'field' to each set in
Possible_Subsets,
// is the result a blocking set?
1.  if (frequency * table_size <=
    Maximum_expected_records_returned)
        // the field by itself is already sufficiently selective, just add field
    to Blocking_sets
        a. insert {field} into Blocking sets
2.  else
    a.  for_each set_of_fields in copyOf(Possible_Subsets)
    b.      get expected_count of set_of_fields
    c.      expected_count = expected_count * frequency
    d.      new_possible_blocking_set = insert field into
            set_of_fields
    e.      if (expected_count <=
            Maximum_expected_records_returned)
            then
                insert new_possible_blocking_set into
                Blocking_sets
    f.      else
                insert new_possible_blocking_set into
                Possible_Subsets
    g.      end_if
    h.  end_for
3.  end_if
```

Complexity and Performance

Given n fields specified in S, the exemplary automated blocking algorithm considers all $2^n$ sets of fields, but prunes the space and considers sets in increasing size from 1. The exemplary automated blocking algorithm is worst-case exponential in the number n of fields in S and the largest number of blocking sets produced is $$\binom{n}{\lceil n/2 \rceil}$$

thanks to pruning optimizations. In the presence of derived fields and multiple values for the same field, the sum of the products of the number of values times usages for each field has to be substituted in the formula. Namely, (1) the exemplary automated blocking algorithm does not consider supersets of queries, which are already sufficiently selective, and, (2) the exemplary automated blocking algorithm knows the frequency of each field in the query, thus enabling us to compute the projected selectivity of each set of fields and determine when a set of fields is sufficiently selective.

As a practical matter, because the expected count of a blocking set declines multiplicatively with the addition of each field, the typical blocking set contains few fields. In a test of the exemplary automated blocking algorithm on a large database, we found that the maximum number of fields in any given SELECT was 2 and the maximum number of blocking sets in a query was 35 with 12 configured blocking fields and up to 4 values per field.

Other Exemplary Issues

Multiple Tables

To simplify the discussion, we have proceeded to this point as if the database D contained only one table. In practice D usually may contain multiple tables. This is the true, for example, when D stores multiple values for an individual field (a practice called 'stacking') in which case a separate table is employed to store the multiple values. The exemplary automated blocking algorithm handles multiple tables as follows:

Tables that do not store fields matching those in S are ignored.

All fields are specified by the form TABLE_NAME.FIELD_NAME.

Tables that store the entity's unique identifier (with the same semantics as the field T.ID mentioned in Section 6) are queried directly.

Tables that do not store the entity's unique identifier are joined with tables that do. The joins are implemented in views. The system installer specifies the views or they can be automatically generated from the schema.

The preparation obtains the number of records in each table and view that blocking uses. This value replaces NUMBER_RECORDS in the algorithm.

The COUNTS table stores a TABLE_NAME field identifying the table or view containing the field.

The expected number of records returned is computed as follows. Let MID be a unique id for all records in the non-stacked main table. Let |MID| be the number of distinct records in the main table for the queried entity. Let |ID(T)| be the number of distinct MIDs for which there exists one or more associated entries in table T. Let $c_f(v)$ be the number of distinct MIDs that have an associated row with value v in column f. From table Ti we have $x_i$ fields. A blocking set that requires all fields $fi_k$ of table Ti to have values $vi_k$ is expected to return the following number of records:

$$E = \frac{c_{f1_1}(v1_1) * \ldots * c_{f1_{x_1}}(v1_{x_1}) * \ldots * c_{fn_1}(vn_1) * \ldots * c_{fn_{x_n}}(vn_{x_n})}{|MID|^{n-1} * \prod |ID(Ti)|^{x_i - 1}}$$

In the presence of stacked data and multiple values from the same stacked table or stacked tables that are in an ancestor-descendant relationship, an additional decision has to be made. Consider the case where we search for FIRST_NAME='JIM' and LAST_NAME='SMITH'. and where the database contains a person with stacked names JIM SMYTHE and JAMES SMITH. If this record should be returned by blocking, we can write the query as SELECT ID FROM NAMES A, NAMES B
    WHERE A.FIRST_NAME='JIM' AND B.LAST_NAME='SMITH' AND
        A.ID=B.ID rather than

SELECT ID FROM NAMES WHERE FIRST_NAME='JIM' AND LAST_NAME='SMITH'

The choice between the two options is one between higher accuracy and higher speed. Which option is chosen may depend upon the characteristics of the data. For example, in the case of names the first approach is typically better suited. On the other hand, if the two fields were street name and street number and stacked addresses were (mainly) used to store past addresses rather than spelling variations, the second option may be preferred. Since both approaches are useful in certain cases, we can allow the user to select in the configuration.

In the first approach, the two instances of the names table are to be considered as different tables for the formulas above.

A similar choice can be made for the source record if it contains stacked data. For example, if the source record has stacked names JIM SMYTHE and JAMES SMITH, we can allow or disallow the generation of blocking sets containing the first name from one stacked node and the last name from the other. Again, both options are useful depending upon the characteristics of the data and we let the user select in the configuration.

Derived Fields

Blocking finds approximate matches to the search because (1) it matches on only some of the fields in the search, and (2) it matches on error-correction fields, which are stored in the database. For example, if the database stores the Soundex phonetic transformation of LAST_NAME then blocking may try to match a Soundex of LAST_NAME in the search with Soundex (LAST_NAME) in the database. Thus, blocking generates derived fields from the search and matches them against values in the database. Derived values may be stored in the database rather than recomputed for every query for performance reasons.

In general, derived fields take two forms:

Error-tolerant: A field that tolerates errors in a stored field as in the Soundex example above.

Moved: A field that finds data that has been moved and stored in the wrong field. For example, blocking would seek a match between FIRST_NAME in the search and LAST_NAME in the database.

These derived fields can also be composed, that is, a moved, error-tolerant field can be matched. For example, blocking might retrieve records in which SOUNDEX_LAST_NAME equals Soundex(search.FIRST_NAME).

There are two situations where error toleration functions are employed—when data is entered into the database, and when a search is executed. On data entry, the error-tolerated values of certain fields (designated by configuration information) are computed and stored in error toleration fields. Some databases, such as Oracle 8i, can create an index on a function on a field, removing the need to store the result of the error toleration function in a field. For example, the configuration might indicate that whenever the field PHONE is inserted or updated, the value of the function hash (PHONE) should be stored in the field HASH_PHONE as follows:

| Source field | Error correction function | Error tolerant field |
|---|---|---|
| LAST_NAME | Soundex | SOUNDEX_LAST_NAME |
| PHONE | Hash | HASH_PHONE |

In response to a search, a configuration table that indicates which derived fields should be considered for blocking controls the use of derived fields. Considering the number of fields specified in a search, the number of error correction functions, and the number of field moves, the range of possible derived fields could be huge. The configuration table selects a modest set of derived fields that are likely to correct actual errors in searches and the database. The system installer experiments with different configurations to select a good one, striking a balance between the desired accuracy (which requires more derived fields) and the need for speed (which requires fewer).

Blocking incorporates derived fields by prefacing the algorithm described in Section 2 with code that adds derived fields to S:

Add_derived_fields_to_S:

```
1. read search S
2. for_each field, value in S
3.     if (derived_field_configuration_table derives a moved or error-
       corrected field from field) then
4.         add the moved or error-corrected field to S
5.     end if
6. end_for
```

The resulting S is used for blocking.

In the presence of moved fields, we can choose to allow the same value to be used for multiple fields or not. For example, if the search's first name is JOHN and blocking is configured to use the search's first name also on the last name field in the database, we can decide whether or not to allow the following blocking set:

SELECT ID FROM T WHERE
FIRST_NAME='JOHN' AND LAST_NAME='JOHN'

As a variation, we can allow the above only if the search specified JOHN for both the first and last name.

If the same value is specified multiple times for the same field or if the same value is specified for field A and B and blocking is configured to use the search's value of A on B, the exemplary automated blocking algorithm avoids creating duplicate blocking sets.

Dependent Fields

Some field combinations do not make sense in a blocking set because the value in some fields depend on the value in other fields. For example, adding the condition FIRST_NAME='JOHN' to the condition SOUNDEX_FIRST_NAME=SOUNDEX('JOHN') is unnecessary because every record that satisfies the second condition must satisfy the first condition. Given the variety of derived field functions, many dependencies between blocking fields may arise. In order to avoid adding unnecessary conditions that would needlessly slow the execution of the blocking query, the blocking algorithm tracks the dependencies between fields.

The exemplary automated blocking algorithm implementation does not create blocking sets that independent of the data in the database return a subset of the records of another blocking set. E.g., if we have a blocking set SOUNDEX_FIRST_NAME=SOUNDEX ('JOHN') no blocking set containing FIRST_NAME='JOHN' would be created.

Also, if multiple values have the same derived value, e.g., SOUNDEX ('JOHN')=SOUNDEX ('JON'), the exemplary automated blocking algorithm does not create redundant blocking sets if both values are passed by the search.

Another related complication arises when a search contains a stacked field. For example, a search could be ((FIRST_NAME, 'JOE'), (FIRST_NAME, 'JOEY'), (LAST_NAME, 'SMITH'), (DOB, '10/01/98'))

In such cases it does not make sense to combine two where—clauses involving FIRST_NAME in a blocking query, because no record could match both. Thus, a blocking set clause, which contained

FIRST_NAME='JOE' AND FIRST_NAME='JOEY' would always return no records. The blocking algorithm avoids creating such queries.

Exemplary Illustrative Automated Blocking Algorithm Accuracy

We tested the missed match accuracy of an illustrative implementation of automated blocking algorithm on a training set consisting of 2283 matched record pairs. For each pair we used some values from the base record to form a search S, and then evaluated whether automated blocking algorithm found the matching record in the immunization database. The table below shows that only 2.4% of matches are missed when the search looks for 5 common fields, and that the error drops to 0.92% when 4 derived fields are added to the search. This is excellent performance for this particular test.

| Values from base record in search | Derived fields | Missed matches |
|---|---|---|
| Firstname, Lastname, DOB, Patient_ID, Phone_number | None | 2.4% |
| Firstname, Lastname, DOB, Patient_ID, Phone_number | Soundex of Firstname, Soundex of Lastname, Firstname movedto Lastname, Lastname movedto Firstname | 0.92% |

Automatic Selection of Blocking Fields

Rather than selecting the potential blocking fields manually, the set of optimal blocking fields can be computed automatically for a given speed or accuracy requirement. This auxiliary algorithm works as follows.

1) Select all fields as blocking fields, or have the user define a large set containing all potentially useful fields.
2) Perform deduplication or linking using this large set of fields as the potential blocking fields in the automated blocking algorithm. The second-stage matching algorithm decides which of the records returned by blocking are matches or possible matches.
3) Using the output of step 2, find an optimal or near-optimal subset of the original large set of blocking fields given specified speed or accuracy requirements.

In Step 3, optimal for a specified speed requirement means the set of fields that creates the lowest number of false negatives while satisfying the speed requirement. If, on the other hand, accuracy is specified, then optimal means the set of fields that yields the highest speed while satisfying the accuracy requirement. Since Step 3 can be performed using compact data structures, the whole step can be performed in memory even for large data sets, which makes an exhaustive search possible.

In further detail, an exemplary implementation of automatic blocking field selection is:

1. Select all fields as the set F of blocking fields for the automated blocking algorithm.
2. Perform deduplication on the target database D (or a subset of D) using F
   2.1. For each deduplication search record, S, generated from D, run the automated blocking algorithm on S. Score the returned records using the second-stage matching algorithm and retain all records which the second-stage matching algorithm scores as a match or possible match. Record in a compact data structure which blocking fields match S on each returned record.
3. Find an optimal or near-optimal subset of F. Set F'=F.
   3.1. For each search record S
      3.1.1. For each field f in F'
         3.1.1.1. Use the automated blocking algorithm to compute the query, Q, that would be generated if the set of blocking fields were {F'–f}
         3.1.1.2. Using the compact data structure, rapidly compute the number of records, n, that would not be retrieved by Q.
         3.1.1.3. Add n to the running total of the number of records, $c_f$ lost by omitting f from F'.
   3.2. Remove the field f from F' for which $c_f$ is the lowest. Remove the records from the compact data structure that were determined to be lost by the omission of f in step Error! Reference source not found.
   3.3. Check whether a solution has been found already
      3.3.1. If speed has been specified, check whether F' satisfies the speed requirement. If so, stop and use F' as the result. Otherwise recurse to step 3.1.
      3.3.2. If accuracy has been specified, check whether F' satisfies the accuracy requirement. If so, recurse to step 3.1. Otherwise, use F'+f (from Error! Reference source not found.) as the result.

A dual algorithm starts from the empty set of fields F' and adds one field f from F at the time to F'. These greedy algorithms are fast, but are not guaranteed to find the optimal solution in all cases. Other slower algorithms, including exhaustive search, are guaranteed to give the optimal solution.

This approach also works for derived fields. If in Step 1, the user defines the original set of non-derived fields, nothing additional has to be done. If, on the other hand, the set is automatically determined, we add all the moved fields between fields of the same type and all error-tolerant fields for a given set of functions. The latter typically includes Soundex and functions that split a date into year, month, and day.

Optimizations

Database Indices

The database is configured to index all fields that are configured as possible blocking fields. Recognizing the cost of maintaining numerous, possibly unused, indices, each installation monitors actual blocking queries and turns off indexing on those fields that are not used in production blocking queries.

COUNTS Table

In the absence of optimization, the COUNTS table would store a row for every distinct value in the database. Fortunately, the exemplary automated blocking algorithm does not need to record the count of every value of every field—it only needs to store the counts of frequent field values. Hence, we define a threshold for the table such that the exemplary automated blocking algorithm stores the counts for those values that occur more frequently than threshold. If the exemplary automated blocking algorithm attempts to access the count for a field-value for which the count is below the threshold (and therefore not entered in COUNTS table), the field's threshold value is used. This overestimates the number of records returned by matching on this value, which ensures that the resulting blocking sets will not return too many records.

Setting the counts threshold equal to the Maximum_expected_records_returned value optimizes the COUNTS table. This has the effect of forcing fields with counts below the threshold to always be used as a single-field SELECT in the blocking algorithm. In other words, such fields would not be included in any multi-field SELECT statements. This reduces the COUNTS table size considerably. For example, for the immunization database, on the basis of performance considerations we set Maximum_expected_records_returned threshold to 100.

The table below shows the dramatic decrease in the COUNTS table size for 5 fields and 2 derived fields in the immunization database. The COUNTS table is updated periodically.

| Field | Number of different values | Number of different values with COUNT >100 | Percentage reduction in COUNTS table size |
| --- | --- | --- | --- |
| Firstname | 296282 | 2291 | 99.2 |
| Lastname | 15012 | 2731 | 81.8 |
| DOB | 3167 | 2557 | 19.2 |
| Patient_ID | 3616814 | 18 | 99.9 |
| Phone_Number | 515873 | 28 | 99.9 |
| SOUNDEX(Firstname) | 5823 | 1548 | 73.4 |
| SOUNDEX(Lastname) | 6125 | 2484 | 59.4 |
| Total | 4459096 | 11657 | 99.7 |

Compiled SQL

As a variation, all or just the most common field combinations (blocking sets without values) and even combinations thereof can be created from the list of blocking fields and precompiled. Precompiled SQL is often significantly faster than dynamic SQL.

Factorization of Queries

If a query produces two or more blocking sets with identical conjuncts, e.g., FIRST_NAME='JOE' as in the example of Section 6, we can factor out these conjuncts. In this example, we could combine the second and fifth blocking set to:

SELECT ID FROM T WHERE
FIRST_NAME='JOE' AND
    ((CONTACTS_MAIDEN_NAME='RICHARDSON') OR
    (LAST_NAME='SMITH' AND CONTACT_FIRST_NAME='MARY'))

In most cases it may be best to leave factorization of queries and similar optimizations to the DBMS's optimizer.

Combination of Values

If the query contains multiple values for a field, e.g., first name John or Jim, we can use set membership (SQL IN). E.g., we can write

SELECT ID FROM T WHERE FIRST_NAME IN ('JOHN', 'JIM')

instead of

SELECT ID FROM T WHERE FIRST_NAME='JOHN'
UNION SELECT ID FROM T WHERE FIRST_NAME='JIM'

This also works if the condition is part of a more complex blocking set. Furthermore, the simplification is possible if some of the values are swapped values, e.g., we query for first name John and last name Smith and have blocking configured to use the last name of the query against the first name of the database.

The approach may not work if the different values have different counts. This optimization is especially useful if the blocking set contains another, less frequent field of the same table so that only the index on that field is used.

In most cases it may be best to leave combination of values and similar optimizations to the DBMS's optimizer.

Combined Return Limit

We specify the maximum number of records that each blocking set may return. The number of records returned from blocking may be considerably higher, especially if many blocking sets are built. We can limit the expected maximum of records returned by all blocking sets together by adjusting the per blocking set threshold based on the number of blocking sets produced.

Limitation of the Number and Size of Blocking Sets

In certain situations, overall performance may be higher if more records are returned to second-stage matching algorithm than if a very many blocking queries must be executed. For this purpose, an upper limit on the number of blocking sets and/or the number of fields per blocking set may be set in the automated blocking algorithm. The automated blocking algorithm may then increase the limit of records returned by each blocking set in order to build fewer, less selective blocking sets.

Validity

Fields can be excluded from being used for blocking if they do not satisfy a specified validity predicate. For example, we might not use the first name field for blocking if its value is 'UNKNOWN' or blank. Excluding fields that are unlikely to return actual matches reduces the number of blocking sets and records returned to improve performance.

Possibly Undesirable Combinations

It may not make sense in some applications to combine certain fields into a single blocking field. For example, it may be undesirable to create blocking sets containing conditions on both zip code and city name. The exemplary automated blocking algorithm allows the user to declare illegal combinations. The automated blocking algorithm will not create any blocking sets that contain such combinations as subsets.

Exemplary Correlation Factor

As a special case, an undesirable combination can be marked as exact meaning that the automated blocking algorithm may not create a blocking set containing exactly these fields, but may contain a superset thereof.

The estimation formula above is based on a statistical independence assumption. For certain combinations of fields, e.g., zip code and city name, this assumption does not hold. In this case, the automated blocking algorithm allows a correlation factor to be declared for groups of fields. This factor can be used in the formula if desired.

Eliminating the Independence Assumption

The exemplary algorithm does not depend on an assumption of statistical independence among the different fields composing the search. On the contrary, making use of an advanced selectivity estimation technique such as those found in (Getoor, 2001) can improve the accuracy of the selectivity estimate made in step 2.C of the "ConsiderNewField" function shown above.

Our invention is not to be limited to the disclosed embodiments. For example, nothing in this description should be construed as confining the work to the field of database deduplication. Some other areas affected by this discovery include database linking and approximate searching. On the contrary, the invention is intended to cover various modifications and equivalent arrangements as defined in the claims.

We claim:

1. In a system including a database stored in at least one computer's data storage and a data record stored in computer memory, said database comprising plural records, said plural database records comprising data fields, said data record stored in computer memory including data fields, there being a correspondence between at least a subset of data fields of said data record stored in computer memory and at least a subset of the data fields of said records of said database, a method for identifying records in said database which are similar enough to said data record stored in computer memory that they might describe the same person or thing as that described by said data record stored in computer memory, said method comprising:
   a. inputting a value which will be used to limit the number of records similar to said data record stored in computer memory to be identified within said database;
   b. creating a set of sets of fields in said data record stored in computer memory, where the $i^{th}$ set of said set of sets of fields is obtained by
      i. selecting at least one field in said data record, such that the number of records in said database that store the same values as said data record, in all of the corresponding fields of said database is estimated to be fewer than said inputted value, and
      ii. setting the $i^{th}$ set of said set of sets of fields equal to the set of said selected field(s) in said data record;
   c. selecting or constructing a database query to retrieve from said database the records which store the same values as said data record stored in computer memory in all the corresponding fields in at least one set of said set of sets of fields, and
   d. executing said database query to retrieve said retrieved records from said database into computer memory.

2. The method of claim 1 wherein said database comprises data records, and wherein each record of said database is first augmented with at least one field-value pair which is a function of said record, to form an augmented database and where the data record stored in computer memory is first augmented with at least one field-value pair which is a function of that data record to form an augmented data record and wherein each of the said set of fields is selected from said augmented data record and the above-mentioned steps are performed using the augmented data record and the augmented database.

3. The method of claim 2 further including eliminating at least some parts of said query which are guaranteed to retrieve a subset of the records in the augmented database that would be retrieved by another part of said query.

4. The method of claim 3 further including retrieving information from a data structure containing counts of the number of occurrences of a subset of the distinct field-value pairs in the augmented database.

5. The method of claim 1 wherein said retrieved records are passed to a matching algorithm that assigns to each retrieved record a decision on whether said retrieved record matches said data record stored in computer memory, whether said retrieved record does not match said data record stored in computer memory, or whether said matching algorithm determines that it is ambiguous whether said retrieved record matches said data record stored in computer memory.

6. The method of claim 2 further including forming said query by searching at least some possible subsets of the augmented data record.

7. A method for identifying records in a database which are likely matches to a set of at least one field-value pairs, comprising the following steps:
   a. constructing a query from said set of field-value pairs such that said query will return the maximum number of records from said database while satisfying a user-defined speed constraint, wherein said query is constructed by evaluating the expected record count associated with said query against said predetermined speed constraint;
   b. executing said query against said database to retrieve a set of records that satisfy said query; and
   c. passing said retrieved set of records to a matching algorithm which determines, for each record in said retrieved set of records, whether said retrieved record matches said set of at least one field-value pairs, whether said retrieved record does not match said set of at least one field-value pairs, or whether said matching algorithm can not determine whether said retrieved record matches said set of at least one field-value pairs.

8. The method of claim 7 where said query is composed of a set of subqueries.

9. The method of claim 8, where each subquery in said set of subqueries is constructed so that it is estimated to return less than a user-defined maximum number of records.

10. The method of claim 9, wherein said database comprises records, and further including:
   augmenting each record of said database with at least one field-value pairs which are functions of said record to form an augmented database,
   augmenting said set of field-value pairs with at least one field-value pair which is a function of said set of field-value pairs to form an augmented set of field-value pairs, and
   executing each subquery to select records in said augmented database that match said set of augmented field-record pairs.

11. The method of claim 10 further including eliminating at least one part of said query which is guaranteed to retrieve a subset of the records in the augmented database that would be retrieved by another part of said query.

12. The method of claim 11 further including retrieving information from a data structure containing counts of the number of occurrences of a subset of the distinct field-value pairs present in the augmented database.

13. The method of claim 10 further including forming said query by searching at least some possible subset of said augmented set of field-value pairs.

14. The method of claim 1 where said estimate in step b.i. is obtained by accessing a prestored frequency table giving frequencies for a subset of the values found in said database, said frequency table having been collected in a computer's data store prior to said data record stored in computer memory being known.

* * * * *